UNITED STATES PATENT OFFICE.

JAMES N. TUTTLE, OF LYNN, AND JOSEPH W. PHELAN, OF MEDFORD, MASSACHUSETTS, ASSIGNORS TO KALMUS, COMSTOCK & WESTCOTT, INC., OF BOSTON, MASSACHUSETTS, A CORPORATION OF MASSACHUSETTS.

METHOD OF REFINING CACAO-OIL.

1,386,471.     Specification of Letters Patent.     Patented Aug. 2, 1921.

No Drawing.     Application filed July 15, 1919. Serial No. 311,056.

*To all whom it may concern:*

Be it known that we, JAMES N. TUTTLE and JOSEPH W. PHELAN, residing at Lynn, county of Essex, and Medford, county of Middlesex, Commonwealth of Massachusetts, respectively, have invented a certain Improved Method of Refining Cacao-Oil; and we do hereby declare the following to be a full, clear, and exact description of the invention, such as will enable others skilled in the art to which it appertains to make and use the same.

The present invention relates to an improved method of refining cacao oil.

In extracting chocolate from the cacao bean after the roasting, crushing and filtering operations, the oil which runs off from the filter press, known as cacao oil or cacao butter, consists of a mixture of glycerids of stearic, palmitic and arachidic acids containing chocolate in suspension and certain volatile substances which give it its characteristic odor and taste. The chocolate in suspension is removed by filtering through paper or cloth in the usual manner, keeping the temperature above the melting point. The removal, however, of the volatile substances is a matter of difficulty, as it is necessary that the constitution of the oil remain unchanged. One of the uses to which the refined oil is especially adapted is the manufacture of margarin.

The object of this invention is to produce a method of refining cacao oil, and particularly a method by which the odorous and gustable ingredients of the oil may be removed without injury to the constitution of the oil. To this end the invention consists in the method of refining cacao oil hereinafter described and particularly defined in the claims. The cacao oil, as it comes from the chocolate manufacturers is first filtered in the usual manner to remove the solid chocolate constituent by filtering it through paper or cloth and keeping the temperature above the melting point.

The gustable and odorous ingredients of the oil are numerous and complicated substances which are present in small percentages, and are all characterized by their volatility. According to the present invention, these substances are removed by a treatment with alkalized fullers' earth. It is well known that objectionable coloring matter may be removed from oils in general, by treatment with fullers' earth. It has been found that while the objectionable odors in cacao oil may be removed by treatment with fullers' earth, there still remains in the oil a distinct earthy taste which renders the refined oil unfit for use as a comestible. Treatment of the fullers' earth with an alkaline material, thus alkalizing the earth, and the subsequent treatment of cacao oil with the alkalized fullers' earth, entirely remove this objectionable earthy taste and leave the cacao oil in an odorless and tasteless condition suitable for use as a comestible. The preferred method of procedure of alkalizing the fullers' earth is described as follows:—

The fullers' earth used for treatment of the oil is prepared by shaking fullers' earth in a powdery condition with lime water (calcium hydroxid solution U. S. P.) and then filtering through cloth or paper, washing repeatedly with distilled water to remove any free lime and drying in a hot closet and powdering. The fullers' earth in this specification will be referred to as "alkalized fullers' earth" for convenience in defining the invention.

The preferred form of refining the cacao oil is described as follows:—To 100 parts of cacao oil, 5 parts of alkalized fullers' earth are added, and the mixture is violently agitated for some hours, and then the fullers' earth is removed by filtration through cloth or paper in a convenient manner, preferably by the use of a filter press. The alkalized fullers' earth removes from the oil all gustable and odorous volatile substances, and as well, a considerable portion of the coloring matter, so that the refined oil is a clear cacao oil deprived of any conspicuous taste or odor, and of a pale yellow color. A variation or modification of the process described consists in adding to the 100 parts of cacao oil, 5 parts by weight of untreated fullers' earth, and ¼ of a part by weight of calcium hydroxid, violently agitating the mixture, and then removing the fullers' earth and calcium hydroxid by filtration through cloth or paper, but preferably by the use of a filter press.

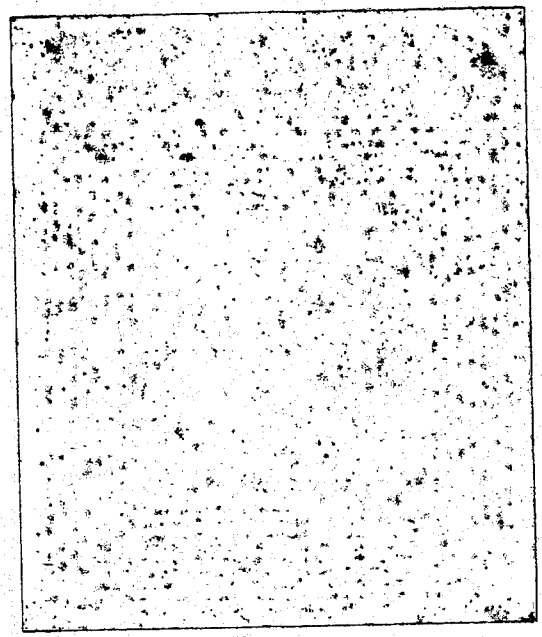

Having thus described the invention, what is claimed is:

1. The method of refining cacao oil which consists in adding to 100 parts of oil 5 parts of alkalized fullers' earth, and subjecting the mixture to agitation, and filtering the alkalized fullers' earth from the mixture.

2. The method of refining cacao oil which consists in adding to 100 parts of oil 5 parts of untreated fullers' earth and ¼ part of an alkaline material, agitating and settling the mixture and filtering off the oil.

3. The method of refining cacao oil which consists in agitating the oil with alkalized fullers' earth, and filtering off the alkalized fullers' earth from the mixture.

JAMES N. TUTTLE.
JOSEPH W. PHELAN.